_United States Patent_ [19]

Schipfer et al.

[11] Patent Number: 4,771,087

[45] Date of Patent: Sep. 13, 1988

[54] HARDENER COMPONENT FOR STOVING PAINT BINDERS AND PROCESS OF PRODUCING SAME

[75] Inventors: Rudolf Schipfer; Gerhard Schmölzer; Wolfgang Daimer, all of Graz, Austria

[73] Assignee: Vianova Kunstharz A.G., Werndorf, Austria

[21] Appl. No.: 48,588

[22] Filed: May 11, 1987

[30] Foreign Application Priority Data

May 9, 1986 [AT] Austria .................................. 1235/86
May 9, 1986 [AT] Austria .................................. 1236/86

[51] Int. Cl.$^4$ ........................ C09D 5/44; C08G 59/14
[52] U.S. Cl. .................................... 523/402; 523/414;
523/417; 525/113; 525/329.5; 528/110;
528/121; 528/229; 528/341; 528/365
[58] Field of Search ............... 528/110, 121, 341, 365,
528/229; 525/113, 329.5; 523/402, 414, 417

[56] References Cited

U.S. PATENT DOCUMENTS

| | | | |
|---|---|---|---|
| 4,161,452 | 1/1979 | Stambaugh et al. | 525/380 X |
| 4,405,662 | 9/1983 | Raudenbusch et al. | 528/110 X |
| 4,423,167 | 12/1983 | Valko | 528/110 X |
| 4,477,642 | 10/1984 | Geist et al. | 528/110 X |
| 4,539,385 | 9/1985 | Geist et al. | 528/110 X |

_Primary Examiner_—Earl Nielsen
_Attorney, Agent, or Firm_—A. W. Breiner

[57] ABSTRACT

The invention discloses crosslinking components for hydroxy and/or primary and/or secondary amine groups containing cationic resins which can be used as binders for stoving paints, particularly for cathodically depositable electrodeposition paints. The crosslinking components are obtained through partial transesterification of transamidation of oligomeric KNOEVENAGEL-reaction products of C-H-active esters and carbonyl compounds with polyols or amines. The products can also be obtained through partial transesterification or transamidation of the C-H-active esters and subsequent KNOEVENAGEL-reaction.

11 Claims, No Drawings

HARDENER COMPONENT FOR STOVING PAINT BINDERS AND PROCESS OF PRODUCING SAME

FIELD OF INVENTION

This invention relates to crosslinking components for use in stoving paint binders which, because of their structure, can be crosslinked through transesterification and/or transamidation. The invention also relates to a process for producing the crosslinking components and to their use, particularly in the formulation of cathodic electrodeposition paints.

BACKGROUND OF INVENTION

EP-B1-0 131 127 discloses a process for producing crosslinking components for use in paint binders crosslinkable through transesterification and/or transamidation, characterized in that compounds of the structure -

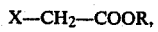

X—CH$_2$—COOR, wherein X is —COOR, —CN or COCH$_3$ and R is an alkyl radical with from 1 to 8 carbon atoms, preferably the diesters of malonic acid with alkanols with from 1 to 4 carbon atoms, are reacted with a carbonyl compound, preferably formaldehyde and in particular paraformaldehyde, with separation of water in the sense of a KNOEVENAGEL-reaction, and the resulting alpha-disubstituted alkylidene compound is polymerized to an oligomeric or polymeric compound with a molecular weight of between 300 and 6000.

GENERAL DESCRIPTION OF INVENTION

It has now been found that compounds obtained according to the reaction -

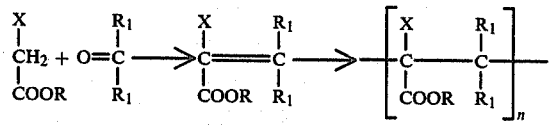

wherein
X is —COOR, —CN or COCH$_3$,
R is an alkyl radical with from 1 to 8 carbon atoms,
R$_1$ is a hydroxy atom or an alkyl radical, and
n is a factor which multiplies the unit to a molecular weight of between 300 and 6000, in the form of their partial transesterification products with polyols or their partial transamidation products with an at least difunctional primary and/or secondary amine, provide crosslinkable products which are greatly improved with regard to their film-forming characteristics.

More specifically, the present invention is concerned with crosslinking components for paint binders crosslinkable through transesterification and/or transamidation, characterized in that the components comprise -

(A-1) a transesterification or transamidation product of compounds of the formula -

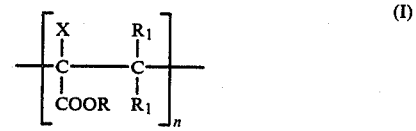

wherein
X is —COOR, —CN or —COCH$_3$,
R is an alkyl radical with from 1 to 8 carbon atoms,
R$_1$ is a hydrogen atom or an alkyl radical, and
n is a factor multiplying the unit to a molecular weight of between 300 and 6000, obtained through partial transesterification with from 0.1 to 1.4 hydroxy equivalents of a polyvalent alkanol or through partial transamidation with from 0.05 to 1.0 NH-equivalents of an at least difunctional primary and/or secondary amine per mole of compound (I), or -

(A-2) compounds of the formula X—CH$_2$—COOR (II), wherein X and R are as above defined, the ester groups thereof being partially transesterified to an extent of from 5 to 80% with a polyvalent alkanol or partially transamidated with an at least difunctional primary and/or secondary amine, and the resulting precondensate being reacted in a KNOEVENAGEL-reaction with a carbonyl compound, and polymerized whereby products (A-1) and (A-2) have a molecular weight of between 1000 and 8000, as determined with gel permeation chromatography.

Further, the invention is directed to a process for producing crosslinking components for paint binders crosslinkable through transesterification and/or transamidation characterized in that -

(M-1) oligomeric KNOEVENAGEL-reaction products of the formula -

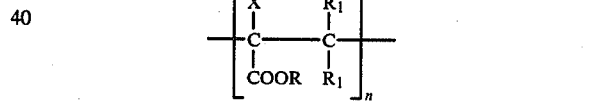

wherein
X is —COOR, —CN or —COCH$_3$,
R is an alkyl radical with from 1 to 8 carbon atoms,
R$_1$ is a hydrogen atom or an alkyl radical, and
n is a factor multiplying the unit to a molecular weight of between 300 and 6000, are transesterified at 130° to 185° C. with from 0.1 to 1.4 hydroxy equivalents of a polyvalent alkanol or are transamidated with from 0.05 to 1.0 NH-equivalents of an at least difunctional primary and/or secondary amine per mole of compound (I) or -

(M-2) 5 to 80% of the ester groups of a compound having the formula -

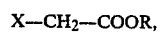

X—CH$_2$—COOR, wherein X and R are as above defined, are transesterified at from 100° to 200° C. with a polyvalent alkanol or are transamidated with an at least difunctional primary and/or secondary amine, and the thus obtained precondensates are reacted with a carbonyl compound in the manner of a KNOEVENAGEL-reaction and are polymerized, whereby in case (M-1) as well as in case (M-2) the reaction is carried out in order that the products have a molecular weight of between 1000 and 8000 as determined by gel permeation chromatography.

The invention is further directed to the use of the paint binders of the present invention in combination with cationic resins carrying hydroxyl groups and/or primary and/or secondary amino groups for the formulation of stoving paints, in particular cathodically depositable electrodeposition paints.

In contradistinction to the binder compositions obtainable with the crosslinking components of EP-B1-0 131 127, with the crosslinking components of the present invention it is possible to substantially modify the properties of the coating compositions prepared therefrom. This applies in particular to the characteristics for electrodeposition binders, such as film thickness and throwing power, or to the formation of a defect-free surface during the crosslinking process. Also, through judicious selection of the reaction partners, the curing characteristics and the adhesion of the components to a substrate and to the following coat can be controlled.

In particular, according to the present process, it is possible to introduce amide groups favorable for cathodic electrodeposition into the crosslinking components. Through modification of the alcohols and the amines with isocyanate compounds it is also possible to introduce urethane or urea groups.

The oligomeric KNOEVENAGEL-reaction products of formula (I) used as the starting materials for method (M-1) are obtained according to EP-B1-0 131 127 through polymerization of alpha-disubstituted alkylidene compounds, which are obtained through reaction of compounds of the structure -

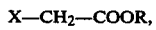

wherein X is COOR, —CN or —COCH$_3$ and R is an alkyl group with from 1 to 8 carbon atoms, with a carbonyl compound, preferably formaldehyde, with the separation of water. The diesters of malonic acid, i.e., where X is —COOR, with alkanols with from 1 to 4 carbon atoms, such as dimethylmalonate, diethylmalonate and n- or isopropylmalonate, are preferably used in the methods of the present invention. Similarly, the alkyl- or cycloalkylesters of cyanoacetic acid can be used, such as methylcyanoacetate, ethylcyanoacetate, propylcyanoacetate, butylcyanoacetate, cyclopentylcyanoacetate, cyclohexylcyanoacetate or methylacetoacetate or ethylacetoacetate.

The carbonyl compound is preferably formaldehyde, particularly its polymerized form, i.e., paraformaldehyde. Higher aldehydes can be used but are of little advantage compared to the inexpensive and readily available formaldehyde. Ketones, such as methylisobutylketone or cyclohexanone, are also suitable.

The oligomers are favorably prepared in order that the paraformaldehyde is added in portions at 60° to 70° C. to the ester and is dissolved therein. A blend of piperidine and formic acid is added to the ester in a quantity of about 0.1 to 1 mole-% as a catalyst for the reaction. The reaction temperature should not surpass 90° C. until the paraformaldehyde has dissolved. Then the temperature is slowly raised and the reaction water which is formed is entrained at 120°-150° C. through azeotropic distillation with an entraining agent, for example an aliphatic or aromatic hydrocarbon. The reaction is monitored by the amount of reaction water formed. The polymerization reaction taking place at the same time is controlled by determining the refractive index or the rise in viscosity. The polymerization can optionally be completed by addition of peroxide initiators. After removing the entraining agent, the crosslinking component can be used substantially solvent-free. Optionally it may be desirable to add inert solvents for easier handling and for better distribution of the base resin in the crosslinking component. The products will have a molecular weight of between about 300 and about 6000.

The reaction products in method (M-1) are reacted with 0.1 to 1.4 hydroxy equivalents of a polyvalent alkanol, such as a divalent alkanol, per 1 mole of KNOEVENAGEL-reaction product. The molecular weight can be increased by a transamidation reaction with 0.05 to 1.0 NH-equivalents of an at least difunctional primary and/or secondary amine per 1 mole of the reaction product. The starting materials are chosen in order that the molecular weight (weight average) of the thus obtained crosslinking component lies between 1000 and 8000. The molecular weight is favorably determined by gel permeation chromatography. The reaction between the obtained reaction product and the alkanol or amine component is carried out at 130° to 185° C., the reaction being monitored through the quantity of alcohol which is split off and the intrinsic viscosity at 20° C. in dimethylformamide.

Suitable polyvalent alcohols for use herein are straight chain or branched alkane diols such as ethylene glycol, its homologues, and their isomers. Polyether diols such as di- or polyalkylene glycols or polycaprolactone diols or diols with ring structures, such as 1,1'-isopropylidene-bis-(-p-phenylene-oxy)-di-ethanol-2 (DIANOL 22) or tricyclodecanedimethanol (TDC-alcohol DM) can also be used. Other suitable polyhydric alcohols are the trimethylol alkanes or pentaerythritol and polyols which are prepared through simple reactions, e.g., by reaction of monoepoxy compounds with secondary alkanol amines or hydroxy carboxylic acids, such as dimethylol propionic acid, or of diamines with alkylene carbonates. Similar reactions leading to polyols as known to those skilled in the art can be used to prepare polyols for use herein. The reaction products of isocyanate compounds and alcohols can be used to produce a polyol containing urethane groups.

Transamidation according to this invention is accomplished with primary and secondary aliphatic amines. Additionally, primary and secondary alkanol amines, such as monomethylethanolamine, 2-amino-2-ethylpropanediol, monoethanolamine and the like, and cyclic polyamines, such as hydroxyethyl piperazine or aminoethylpiperazine, can be used in the transamidation reaction.

In the preparation of the crosslinking components of the invention according to method (M-2), in a first reaction step, 5 to 80% of the ester groups of the esters carrying active methylene groups of formula X—CH$_2$—COOR, wherein X and R have the meaning as hereinbefore defined, are reacted at 100° to 200° C. with polyols and/or polyamines with transesterification or transamidation. The reaction takes place with the separation of the alcohol R-OH, which is favorably removed from the reaction blend with a bubble tray column. The course of the reaction can be monitored via the quantity of distillate or the refractive index of the reaction product.

The alcohol components are the same compounds as are used in method (M-1). The amines are straight chain or branched alkylene polyamines, as long as they have primary and/or secondary amine groups. Further, the corresponding alkanolamines can be used for the process of the invention. Examples are ethylene diamine and its homologues, isophorone diamine, diethylene triamine, or similar substances. Reaction products of the mentioned amines with isocyanate compounds can be used for the introduction of urea groups into the crosslinking component.

As in method (M-1), the reaction product is reacted in the presence of catalysts, normally a blend of piperidine or dicyclohexylamine and formic acid, with the carbonyl compound, preferably formaldehyde in the form of paraformaldehyde with a content of from about 90 to 100% $CH_2O$, in the manner of a KNOEVENAGEL-reaction. Advantageously, the ester catalyst blend is added in portions to paraformaldehyde at 60° to 90° C. The reaction temperature should not surpass 90° C. until the paraformaldehyde has dissolved completely. Then the temperature is raised to 100° C. and held, until the content of free formaldehyde has fallen below 0.5%. Then the reaction water is distilled off, using an entraining agent, and the reaction temperature is held until the desired viscosity and refractive index is attained. The reaction is continued until the crosslinking component attains a molecular weight of about 1000 to 8000, as determined by gel permeation chromatography. In was surprising that the KNOEVENAGEL-reaction, when using the aforesaid precondensates, takes place in a trouble-free and controllable manner.

The crosslinking components prepared according to the present invention are used in combination with base resins capable of transesterification and transamidation reactions. In particular, the products produced according to the invention can be used in water-dilutable paint systems. The crosslinking components proved particularly useful in cathodically depositable coating compositions, the high reactivity of the crosslinking components in many cases allowing the reduction of the stoving temperature to within the range of 130° to 160° C.

Suitable base resins for use herein are products carrying a sufficient number of groups capable of esterification and amidation in order to ensure a satisfactory crosslinking of the film. Resins of this type are disclosed in EP-00 12 463 or AT 372 099. The preferred resins are based on epoxy resins, in particular epoxy resin amine adducts, optionally modified in the sense of inner flexibilization which are specially suited for cathodic electrodeposition. Other preferred base resins are copolymers carrying a sufficient number of protonable groups, either through the use of adequate monomers or through subsequent modification. In order to secure a satisfactory dilutability with water upon partial or total neutralization with acids, the base resins will have an amine value of between 20 and 150 mg KOH/g. The number of groups capable of transesterification or transamidation should correspond to between 40 to 500 mg KOH/g.

In a special embodiment of the invention the base resin and the crosslinking component are subjected to a partial precondensation at from about 80° to 140° C. Through this procedure the compatibility between the components can be considerably improved and phase separation can be avoided, even on prolonged storage of the binders or coating compositions. The components are combined in a ratio of from 60 to 95% by weight (b.w.) of the base resin and of from 5 to 40% b.w. of the crosslinking component of the invention. The preferred mixing ratios are from between 70 to 85% b.w. of the base resin and between 15 to 30% b.w. of the crosslinking component.

The binder compositions of this invention are processed to water-dilutable coating compositions, i.e., neutralization with acids, dilution to application viscosity, and incorporation of pigments and extenders as well as possible forms of application as is conventional in the art. The preferred end use of the coating compositions containing the crosslinking components of the invention is cathodic electrodeposition. The coating compositions are cured at between 120° and 180° C. for 15 to 30 minutes, with optimum resistance characteristics being obtained for the most part at from 130° to 160° C.

The following examples illustrate the invention without limiting its scope. Parts and percentages are by weight and refer to resin solids of the resin components unless otherwise stated.

The following abbreviations for raw materials are used in the examples:

ACEE ... Ethylacetoacetate
MDM ... Dimethylmalonate
MDE ... Diethylmalonate
MDIP ... Diisopropylmalonate
MDBE ... Di-n-butylmalonate
MEBE ... Ethyl-n-butylmalonate
PG ... Propyleneglycol-1,2
NPG ... Neopentylglycol
BD ... Butanediol-1,4
HD ... Hexanediol-1,6
TPG ... Tripropyleneglycol
CAP ... Polycaprolactonediol (molecular weight about 200)
D 22 ... 1,1'-Isopropylidene-bis-(p-phenylene-oxy)-diethanol-2 (DIANOL 22)
TMP ... Trimethylolpropane
CE ... Glycidylester of a $C_9$–$C_{11}$-tert.-monocarboxylic acid
MEOLA ... Monoethanolamine
DOLA ... N,N-diethanolamine
EHA ... 2-Ethylhexylamine
HMDA ... Hexamethylenediamine-1,6
IPDA ... Isophoronediamine
DCHA ... Dicyclohexylamine
DETA ... Diethylenetriamine
DEAPA ... N,N-diethylpropanediamine-13
DEA ... Diethylamine
FA ... Formaldehyde (100%) used as paraformaldehyde, 91%
ECT ... Ethylenecarbonate
PCT ... Propylenecarbonate
TDI ... Toluylenediisocyanate (available isomer blend 80/20)
DMPS ... Dimethylolpropionic acid
AMS ... Formic acid
PIP ... Piperidine
C 1 ... Reaction product of equimolar quantities of CE and DOLA
C 2 ... Reaction product of 1 mole HMDA and 2 moles ECT
C 3 ... Reaction product of 1 mole TDI and 2 moles BD
C 4 ... Reaction product of 1 mole HMDA and 2 moles PCT
C 5 ... Reaction product of equimolar quantities CE and DMPS
EGL ... Ethyleneglycolmonoethylether
BUGL ... Ethyleneglycolmonobutylether
DEGM ... Diethyleneglycoldimethylether PM ... Propyleneglycolmonomethylether (Methoxypropanol)
DMF ... Dimethylformamide
INS ... Isonanoic acid
AS ... Adipic acid
THPSA ... Tetrahydrophthalic anhydride
TOFS ... Tall oil fatty acid ponent is added and the temperature is raised until distillation starts at about 140° to 180° C. The separation of the alcohol component is preferably carried out with the aid of a bubble tray column. The obtained reaction products have a solids content of between 90 and 96% when dried at 120° C. for 30 minutes.

Table 1 is as follows:

TABLE 1

Examples 1-16

| Ex. No. | Moles Diester | Moles CH$_2$O | Moles Polyol | Ester Equivalents[1] | OH-Value mg KOH/g | Intrinsic Viscosity 20° C./DMF | Refractive Index n 20/D |
|---|---|---|---|---|---|---|---|
| 1 | 1 MDE | 0.5 | 0.2 PG | 48 | below 5 | 2.1 | 1.4632 |
| 2 | 1 MDE | 0.5 | 0.4 NPG | 84 | below 5 | 3.5 | 1.4515 |
| 3 | 1 MDE | 0.5 | 0.4 HD | 87 | 9 | 6.6 | 1.4623 |
| 4 | 1 MDE | 0.5 | 0.4 TPG | 102 | 15 | 8.5 | 1.4569 |
| 5 | 1 MDE | 0.5 | 0.4 CAP | 173 | 15 | 11.9 | 1.4680 |
| 6 | 1 MDM | 0.5 | 0.2 C 1 | 92 | 8 | 3.8 | 1.4645 |
| 7 | 1 MDM | 0.5 | 0.4 D 22 | 113 | 10 | 8.2 | 1.4990 |
| 8 | 1 MDE | 0.5 | 0.2 TMP | 108 | 6 | 6.95 | 1.4642 |
| 9 | 1 MDE | 0.5 | 0.3 C 2 | 113 | below 5 | 6.5 | 1.4643 |
| 10 | 1 MDIP | 0.5 | 0.3 PG | 91 | below 5 | 2.3 | 1.4452 |
| 11 | 1 MDBE | 0.75 | 0.4 PG | 105 | 17 | 2.8 | 1.4608 |
| 12 | 1 MDE | 0.9 | 0.3 PG | 83 | below 5 | 5.2 | 1.4670 |
| 13 | 1 MDE | 0.5 | 0.3 C 3 | 122 | 10 | 7.7 | 1.4995 |
| 14 | 1 MEBE | 0.5 | 0.3 C 4 | 128 | below 5 | 3.5 | 1.4619 |
| 15 | 1 MDE | 0.5 | 0.4 C 5 | 143 | 2 | 11.6 | 1.4565 |
| 16 | 1 MDE | 0.5 | 0.1 DEAPA | 96 | 0 | 3.5 | 1.4588 |

[1] g Resin/1 Ester group

HEOX ... Hydroxyethyloxazolidine
MIBK ... Methylisobutylketone
Val ... Equivalent weight in grams for the designated functional group and, accordingly, is equivalent to groups.
MEQ-value ... Milliequivalents of unreacted epoxide groups and milliequivalents of amine groups per gram of sample (solids).

PREPARATION OF CROSSLINKING COMPONENTS

EXAMPLES 1-16

The crosslinking components type (A-1) are prepared in the described manner from the raw materials listed in Table 1.

In a suitable reaction vessel equipped for azeotropic distillation and a bubble tray column for the separation of the alcohol component formed on partial transesterification or transamidation, a mixture of the ester component and catalyst blend which consists of 0.5 to 1.0 mole-%, calculated on ester, of each of piperidine and formic acid is heated to 70° to 80° C. and paraformaldehyde is added in portions. The reaction is exothermic and the temperature should not surpass a maximum of 90° C. until the formaldehyde is dissolved. The temperature is held until the paraformaldehyde has dissolved completely. Then the temperature is slowly raised to 110° to 120° C., and the reaction water which forms is separated from the reaction mixture with the aid of a suitable entraining. After the entraining agent is vacuum-stripping, the polyol component or the amine com-

EXAMPLES 17-25

From the raw materials listed in Table 2, cross-linking components type (A-2) are prepared in the following way:

In a suitable reaction vessel equipped for azeotropic distillation and a bubble tray column for separating the alcohols formed on partial transesterification and transamidation, the blend of ester and transesterification or transamidation component is heated to 120° C. and with the temperature rising to 180° C., the alcohol set free from the ester is separated through the bubble tray column. The course of the reaction is monitored through the quantity of distillate formed. The course of reaction can also be controlled by determining the refractive index of the reaction mass.

After cooling to 60° C., the catalyst blend and then paraformaldehyde is added in portions. The reaction is exothermic and the temperature should not surpass 90° C. until the formaldehyde is dissolved. When the formaldehyde has completely dissolved, the temperature is raised to 100° C. and held until the content of free formaldehyde has fallen to below 0.5%. The reaction water formed is vacuum-stripped with an entraining agent, such as a hydrocarbon solvent having an adequate stoving range. Then the temperature is held until the final values are attained. The reaction products have a solids content of over 90% when dried for 30 minutes at 20° C.

Table 2 is as follows:

TABLE 2

Examples 17-25

| Ex. No. | Ester Moles | Reactions-Partner Moles | Formaldehyde Moles | Catalyst | Refractive Index n 20/D | Intrinsic Viscosity 20°/DMV | Ester Equivalents[2] |
|---|---|---|---|---|---|---|---|
| 17 | 1 MDE | 0.2 NPG | 1.0 | 10 mM PIP 10 mM AMS | 1.4670 | 3.7 | 87 |
| 18 | 1 MDM | 0.2 NPG | 0.5 | 2.5% Adduct[1] | 1.4645 | 3.0 | 74 |
| 19 | 1 MDM | 0.2 PG | 0.5 | 4 mM PIP/AMS | 1.4627 | 2.6 | 71 |
| 20 | 1 MDE | 0.3 D 22 | 1.0 | 1 mM PIP/AMS | 1.4993 | 3.8 | 131 |

TABLE 2-continued

Examples 17-25

| Ex. No. | Ester Moles | Reactions-Partner Moles | Formaldehyde Moles | Catalyst | Refractive Index n 20/D | Intrinsic Viscosity 20°/DMV | Ester Equivalents[2] |
|---|---|---|---|---|---|---|---|
| 21 | 1 MDE | 0.2 TMP | 1.0 | 10 mM PIP/AMS | 1.4670 | 6.2 | 89 |
| 22 | 1 MDM | 0.2 IPDA | 1.0 | 2 mM DCHA<br>2 mM AMS | 1.4759 | 4.0 | 106 |
| 23 | 1 MDE | 0.3 HD | 1.0 | 10 mM PIP/AMS | 1.4686 | 4.5 | 186 |
| 24 | 1 MDE | 0.5 HD | 0.75 | 2 mM PIP/AMS | 1.4630 | 4.8 | 178 |
| 25 | 1 MDE<br>1 ACEE | 1.0 HD | 1.0 | 2 mM PIP/AMS | 1.4735 | 4.6 | 107 |

[1] Base Resin A-1 neutralized with 40 mMol formic acid per 100 g resin solids.
[2] g Resin/1 Ester group

USE OF THE CROSSLINKING AGENTS PREPARED ACCORDING TO THE INVENTION IN PAINT FORMULATIONS

The crosslinking agents prepared according to Examples 1-25 are combined with various base resins A-1 through A-7 at the conditions listed in Table 3. The components are mixed or partially reacted as 70% solution in PM.

PREPARATION OF BASE RESINS

The products used as base resins are prepared as follows:

Base Resin A-1: 190 g of a bisphenol-A-epoxy resin (1 epoxy equivalent) and 1425 g of a bisphenol-A-epoxy resin (3 epoxy equivalents) are dissolved at 100° C. in 597 g of EGL. The solution is cooled to 60° C. and 126 g DOLA are added. The temperature is slowly raised within 2 hours to 80° C. and 169 g DEAPA are added. The temperature is raised within 2 hours to 120° C. At this temperature, 478 g CE are added. The reaction temperature is raised to 130° C. and held at that temperature for 5 hours while stirring. The batch is diluted with EGL to 65% resin solids. The amine value of the resin is 91 mg KOH/g and the hydroxyl value is 265 mg KOH/g.

Base Resin A-2: 2 g azobisisobutyronitrile are dissolved in 40 g isopropanol with warming. To the clear solution at reflux temperature (at about 84° C.) a monomer blend of 20 g glycidylmethacrylate, 20 g hydroxyethylmethacrylate, 20 g methylmethacrylate and 40 g 2-ethylhexylacrylate, in which 2 g azobisisobutyronitrile are dissolved, is added continuously within 2 hours. The reaction mass is stirred at reflux temperature for another 3 hours. At 85° C. a homogeneous solution of 16 g diisopropanol amine in 20 g BUGL is quickly added to the reaction mass which is stirred for another 2 hours at 90° C. The product is diluted at 90° C. with 13 g EGL and, at 40° C., with 10 g acetone. The resin has a solids content of 57%, an amine value of 58 mg KOH/g, and a hydroxyl value of 250 mg KOH/g.

Base Resin A-3: 380 g of an epoxy novolak resin (epoxy equivalent about 190) are dissolved in 354 g DEGM and reacted at 80° C. with 269 g of a semiester of THPSA and HEOX, as well as with 37 g DEA and 140 g TOFS to an acid value of below 3 mg KOH/g. Then the resin is blended with 10 mMoles acetic acid (3-N) per 100 g resin solids and stirred at 65° C. for 3 hours. The product has a hydroxyl value of 270 mg KOH/g.

Base Resin A-4: 1627 g (3.43 Val) of an epoxy resin based on bisphenol-A (epoxy equivalent weight about 475) are reacted with 226 g (0.24 COOH-Val) of a polyester of 3 moles TMP, 2 moles AS, 1 mole INS, and 1 mole THPSA (acid value 65 mg KOH/g, carboxy equivalent 942 g) in an 85% solution of PM at 110° C. to an acid value of below 5 mg KOH/g. After dilution of the batch with PM to a solids content of 70%, a blend consisting of 94.5 g (0.9 Val) DOLA, 67.5 g (0.9 Val) MEOLA, 78 g (1.2 Val) DEAPA, and 240 g PM is added at 60° C. within 2 hours. Then the temperature is raised to 90° C. and held for one hour. The solids content is adjusted to 70% with PM.

Base Resin A-5: 570 g (3 Val) of an epoxy resin based on bisphenol-A (epoxy equivalent about 190) and 317 g PM are heated to 60° C. and reacted for 2 hours to an MEQ-value of 2.06 with a blend of 116 g (0.9 Val) EHA and 163 g (0.15 NH-Val) of a polymeric amine (A), hereinafter described. Then 1330 g (2.1 Val) of a 75% solution of a bisphenol A-epoxy resin (epoxy equivalent weight about 475) in PM are added. At 60° C., within 1 hour, a solution of 189 g (1.8 Val) DOLA in 176 g PM is added and the reaction is carried to an MEQ-value of 1.57. After addition of a solution of 78 g (1.2 Val) DEAPA in 54 g PM within 1 hour, the reaction is carried out at 60° C. to an MEQ-value of 1.46. The temperature is raised to 90° C. and, within another hour, to 120° C. When a viscosity of I - J (Gardner-Holdt; 6 g resin+4 g PM) is reached, the solids content is adjusted to 65% with PM. The product has an amine value of 117 mg KOH/g and a hydroxyl value of 323 mg KOH/g.

The polymeric amine (A) is obtained through reaction of 1 mole of DETA with 3.1 moles of 2-ethylhexylglycidylether and 0.5 moles of a bisphenol-A epoxy resin (epoxy equivalent about 190) as an 80% solution in PM. The product has a viscosity of 60 to 80 seconds (DIN 53 211/20° C.; 100 g resin+30 g PM).

Base Resin A-6: A modified epoxy-amine adduct as described as base resin A-4 is mixed in the last phase with 5% b.w. of polypropyleneglycol diglycidylether at 90° C. and reacted at 120° C. until all glycidyl groups have reacted. The product has an amine value of 76 mg KOH/g and a hydroxyl value (primary OH) of 89 mg KOH/g.

Base Resin A-7: To a solution of 570 g (3 Val) of a bisphenol-A-epoxy resin in 173 g PM, a blend of 96.8 g (0.75 Val) EHA, 326 g (0.3 NH-Val) of the polymeric amine used in A-5 and 160 g PM is added at 60° C. within 2 hours and reacted to an MEQ-value of 2.15. Then, 1330 g (2.1 Val) of a 75% solution of a bisphenol-A-epoxy resin (epoxy equivalent weight 475) in PM are added, and, at 60° C., within 30 minutes, 210 g (2 Val) DOLA are added. On attaining an MEQ-value of 1.72, 138 g (0.5 NH-Val) of diketimine A, prepared as described hereinafter, dissolved in 245 PM are added and reacted to an MEQ-value of 1.60. The product has a solids content of 70% and a viscosity (Gardner-Holdt;

10 g resin+4 g PM) of L - M. The amine value is 117 mg KOH/g.

Diketimine A is prepared as follows: 103 g DETA are reacted with 200 g MIBK at 120° C. with the separation of 36 g water through azeotropic distillation. The solvent is vacuum-stripped. The reaction product has a refractive index N 20/D of 1.4672.

PREPARATION OF TEST PAINTS

For each 100 g of binder composition, based on resin solids, as listed in Table 3, 29.5 g titanium dioxide, 0.5 g carbon black, 17 g aluminum silicate, and 3 g basic lead silicate are added and milled. In addition, transesterification catalysts are admixed homogeneously. Lead octoate with an effective metal content of 0.5%, calculated on resin solids, is used as the catalyst. After the dispersion of the pigments, the paints are neutralized with formic acid and diluted with deionized water to a solids content of 15%. For paint preparations 2, 8, 20, and 24, a white pigmentation is chosen. Thus, 100 g resin solids, 37 g titanium dioxide and 3 g basic lead silicate are milled, and 0.5% of lead, as lead octoate, are admixed homogeneously.

Table 3 is as follows:

TABLE 3

| Paint Preparation | (A) Base Resin Parts/Preparation No. | | (B) Crosslinking Components Parts/Example No. | | Combination (A) + (B) | Acetone Resistance in seconds |
|---|---|---|---|---|---|---|
| P-1 | 70 | A-6 | 30 | Ex 1 | 2 h 120° C. | over 120 |
| P-2 | 80 | A-2 | 20 | Ex 2 | 2 h 120° C. | 80 |
| P-3 | 70 | A-1 | 30 | Ex 3 | 2 h 100° C. | 80 |
| P-4 | 75 | A 6 | 25 | Ex 4 | 30 min. 60° C. | 100 |
| P-5 | 75 | A-5 | 25 | Ex 5 | 30 min. 60° C. | 80 |
| P-6 | 80 | A-1 | 20 | Ex 6 | 30 min. 60° C. | 80 |
| P-7 | 70 | A-6 | 30 | Ex 7 | 2 h 120° C. | over 120 |
| P-8 | 80 | A-2 | 20 | Ex 8 | 2 h 120° C. | 70 |
| P-9 | 70 | A-5 | 30 | Ex 9 | 1 h 100° C. | 110 |
| P-10 | 70 | A-6 | 30 | Ex 10 | 2 h 120° C. | over 120 |
| P-11 | 80 | A-3 | 20 | Ex 11 | 1 h 100° C. | 50 |
| P-12 | 70 | A-1 | 30 | Ex 12 | 2 h 120° C. | over 120 |
| P-13 | 75 | A-6 | 25 | Ex 13 | 2 h 100° C. | 100 |
| P-14 | 70 | A-4 | 30 | Ex 14 | 30 min. 60° C. | 100 |
| P-15 | 80 | A-3 | 20 | Ex 15 | 30 min. 60° C. | 50 |
| P-16 | 80 | A-1 | 20 | Ex 16 | 1 h 100° C. | 60 |
| P-17 | 70 | A-1 | 30 | Ex 17 | 2 h 120° C. | 120 |
| P-18 | 70 | A-4 | 30 | Ex 18 | 1 h 100° C. | 120 |
| P-19 | 75 | A-3 | 25 | Ex 19 | 30 min. 60° C. | 50 |
| P-20 | 75 | A-2 | 25 | Ex 20 | 2 h 110° C. | 90 |
| P-21 | 75 | A-5 | 25 | Ex 21 | 2 h 120° C. | 100 |
| P-22 | 75 | A-6 | 25 | Ex 22 | 30 min. 60° C. | 60 |
| P-23 | 80 | A-6 | 20 | Ex 23 | 2 h 120° C. | 110 |
| P-24 | 80 | A-2 | 20 | Ex 24 | 2 h 120° C. | 120 |
| P-25 | 70 | A-1 | 30 | Ex 25 | 30 min. 20° C. | 60 |
| P-26 | 75 | A-7 | 25 | Ex 8 | 1 h 120° C. | 120 |

TEST FOR ACETONE RESISTANCE

The acetone resistance is determined by applying an acetone-soaked cotton swab to a pigmented paint film deposited cathodically and stoved for 30 minutes at 160° C. The period of time is recorded after which the film can be scratched with a fingernail.

As will be apparent to one skilled in the art, various modifications can be made within the scope of the aforesaid description. Such modifications being within the ability of one skilled in the art form a part of the present invention and are embraced by the appended claims.

It is claimed:

1. A crosslinking component for paint binders which are crosslinkable through transesterification and/or transamidation, said component being (A-1) a transesterification or transamidation product of a compound of the formula -

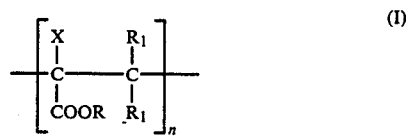

wherein
X is —COOR, —CN or —COCH$_3$,
R is an alkyl radical with from 1 to 8 carbon atoms,
R$_1$ is a hydrogen atom or an alkyl radical, and
n is a factor multiplying the unit to a molecular weight of between about 300 and about 6000, obtained through partial transesterification with from about 0.1 to about 1.4 hydroxy equivalents of a polyvalent alkanol or through partial transamidation with from about 0.05 to an at least difunctional primary (and/or secondary) about 1.0 NH-equivalents of primary or secondary amine per mole of compound (I), or -

(A-2) a compound of the formula -

X—CH$_2$—COOR (II), wherein X and R are have the meaning as above defined, the ester groups thereof being partially transesterified to an extent of from about 5 to about 80% with a polyvalent alkanol or are partially transamidated with an at least difunctional primary and/or secondary amine, with the resulting precondensate being reacted in a KNOEVENAGEL-reaction with a carbonyl compound, and polymerized whereby products (A-1) and (A-2) have a molecular weight of between 1000 and 8000 as determined with gel permeation chromatography.

2. The crosslinking component according to claim 1 wherein said polyol is a divalent alkanol.

3. The crosslinking component according to claim 1 wherein in the compounds of formula (I) and formula (II) the X is —COOR and R is an alkyl radical having from 1 to 4 carbon atoms.

4. The crosslinking component according to claim 1 wherein formaldehyde is the carbonyl compound used in the KNOEVENAGEL-reaction.

5. The crosslinking component according to claim 1 which contains urethane or urea groups in their structure.

6. Process for producing crosslinking components for paint binders which are crosslinkable through transesterification and/or transamidation comprising the steps of (A-1) providing an oligomeric KNOEVENAGEL-reaction product of the formula -

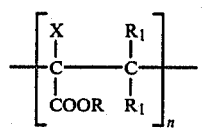 (I)

wherein
X is —COOR, —CN or —COCH$_3$,
R is an alkyl radical with from 1 to 8 carbon atoms,
R$_1$ is a hydrogen atom or an alkyl radical, and
n is a factor multiplying the unit to a molecular weight of between about 300 and about 6000, and transesterifying said reaction product at about 130° to about 185° C. with from about 0.1 to about 1.4 hydroxy equivalents of a polyvalent alkanol or transamidating said reaction product with from about 0.05 to about 1.0 NH-equivalents an at least difunctional (primary and/or secondary) of primary or secondary amine per mole of compound (I), or (A-2) transesterifying from about 5 to about 80% of the ester groups of a compound of the formula -

X—CH$_2$—COOR (II)

wherein X and R are as above defined at a temperature of from about 100° to about 200° C. with a polyvalent alkanol, or transamidating said compound with a polyvalent amine, and thereafter the resultant precondensate being reacted with a carbonyl compound in the manner of a KNOEVENAGEL-reaction, whereby in each of (A-1) and (A-2) polymerization is carried out in order that the products have a molecular weight of between about 1000 and about 8000 as determined by gel permeation chromatography.

7. The process according to claim 6 wherein X in each of formula I and II is —COOR and R is an alkyl radical having from 1 to 4 carbon atoms.

8. The process according to claim 6 wherein formaldehyde is used as the carbonyl compound for the KNOEVENAGEL-reaction.

9. The method of crosslinking hydroxy and/or primary and/or secondary amino group containing cationic resins with the crosslinking components according to claims 1-4.

10. The partial precondensate prepared from a cationic resin and the crosslinking components prepared according to claims 1-4.

11. Cathodically depositable electrodeposition paints containing as binder blends products which are condensates of hydroxy and/or primary and/or secondary amine groups containing resins and the crosslinking component of claims 1-4.

* * * * *